No. 805,875. PATENTED NOV. 28, 1905.
F. O'NEILL.
MACHINE FOR GATHERING AND DELIVERING GLASS.
APPLICATION FILED JUNE 9, 1904.

4 SHEETS—SHEET 1.

Witnesses

Inventor
Frank O'Neill

No. 805,875. PATENTED NOV. 28, 1905.
F. O'NEILL.
MACHINE FOR GATHERING AND DELIVERING GLASS.
APPLICATION FILED JUNE 9, 1904.

4 SHEETS—SHEET 3.

Witnesses  Inventor
Lindsay deB. Little  Frank O'Neill,
Vinnie M. Myers.  By Jno. Nesbit
 Atty.

UNITED STATES PATENT OFFICE.

FRANK O'NEILL, OF DETROIT, MICHIGAN.

MACHINE FOR GATHERING AND DELIVERING GLASS.

No. 805,875.  Specification of Letters Patent.  Patented Nov. 23, 1905.

Application filed June 9, 1904. Serial No. 211,819.

*To all whom it may concern:*

Be it known that I, FRANK O'NEILL, a citizen of the United States, residing at Detroit, in the county of Wayne and State of Michigan, have invented certain new and useful Improvements in Machines for Gathering and Delivering Glass, of which the following is a specification, reference being had therein to the accompanying drawings.

This invention relates to a machine for automatically gathering glass from a furnace or other receptacle and for delivering the gathered glass in predetermined quantities or charges for pressing, blowing, or other use.

In the operation of machines for pressing or for pressing and blowing tumblers, fruit-jars, and other glass articles it is the present practice to gather the glass by hand, carry it to the molds, and sever it from the gathering-irons by hand-operated shears. This work keeps several hands occupied for each machine, and there are unavoidable variations in the charges.

The primary object of the present invention is to provide a machine which will automatically gather the glass and automatically deliver it to the molds in uniform charges, thus doing away with the manual operations and securing uniformity in the product.

Figures 1, 6, 8:
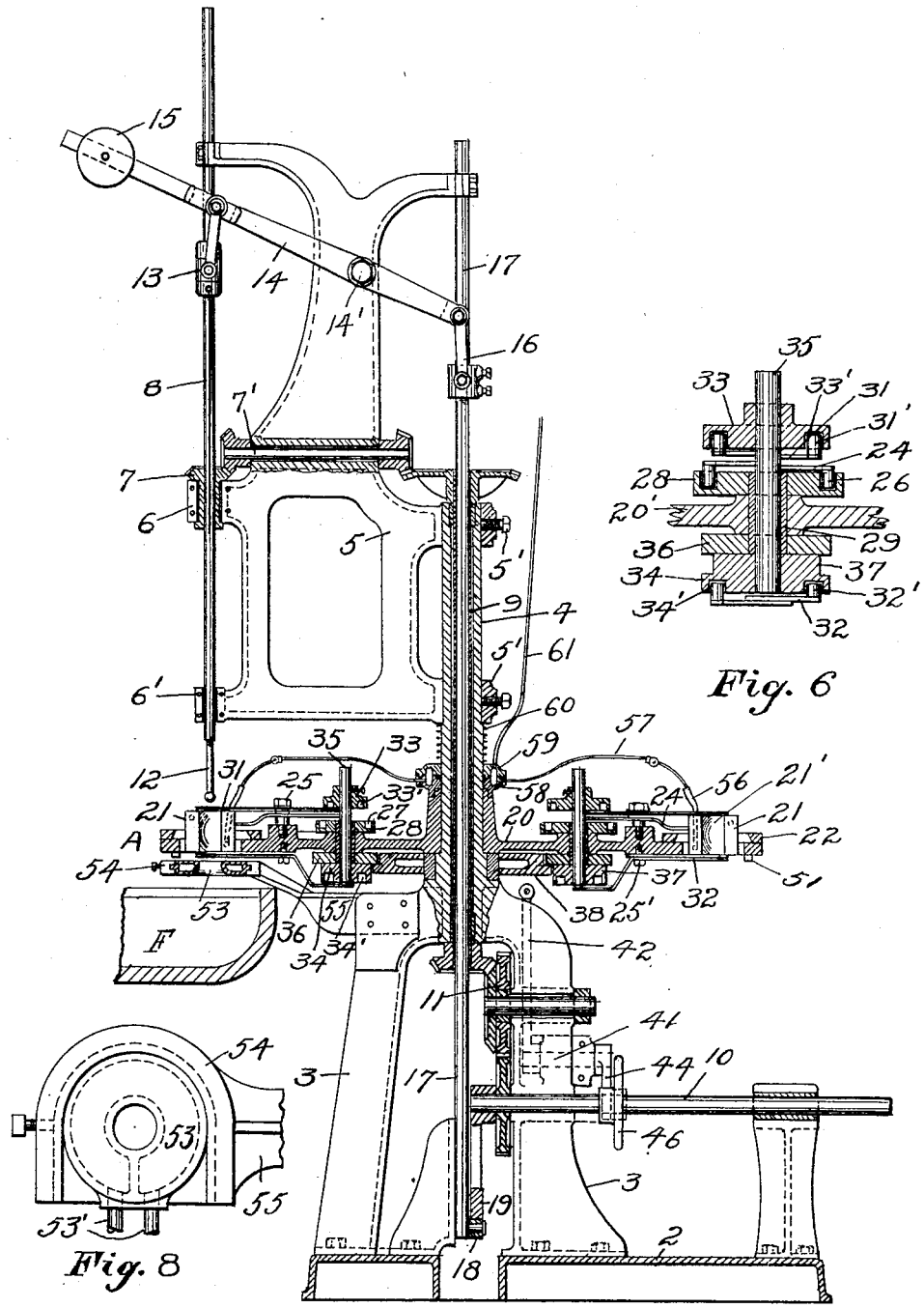
Figure 2:
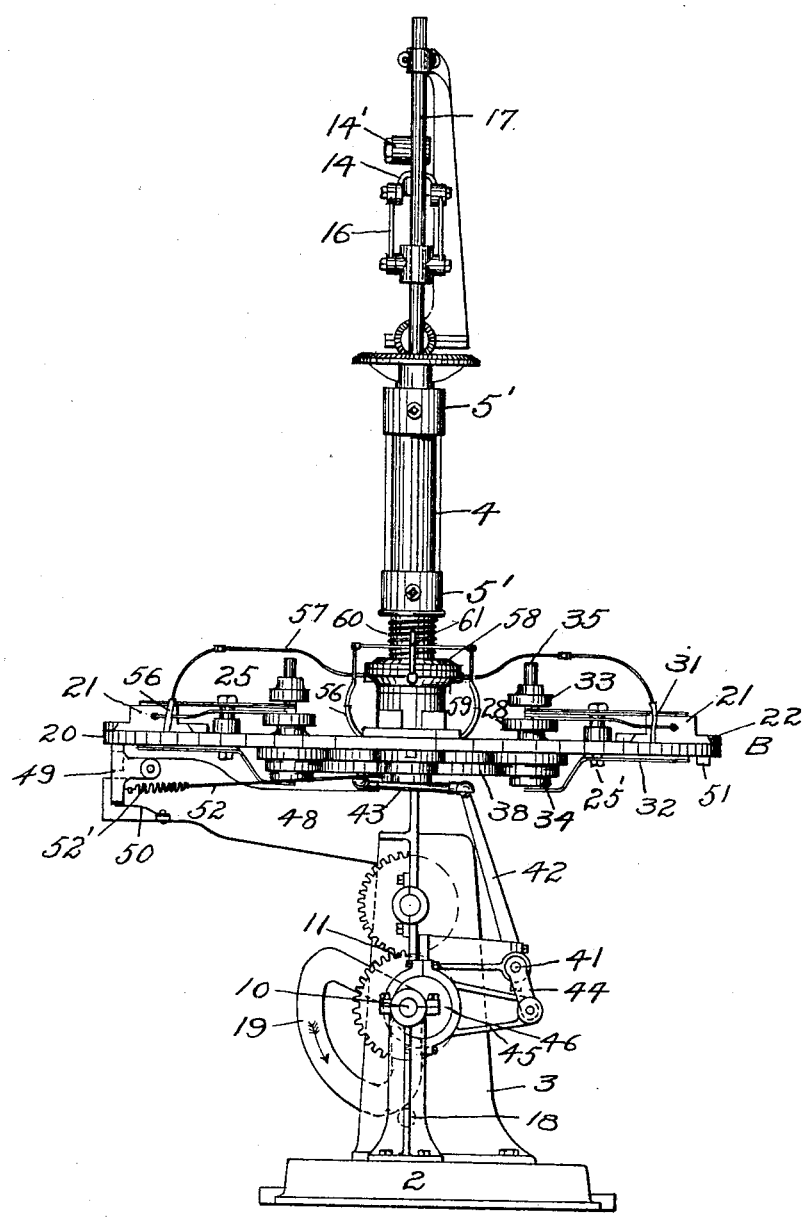
Figure 3:
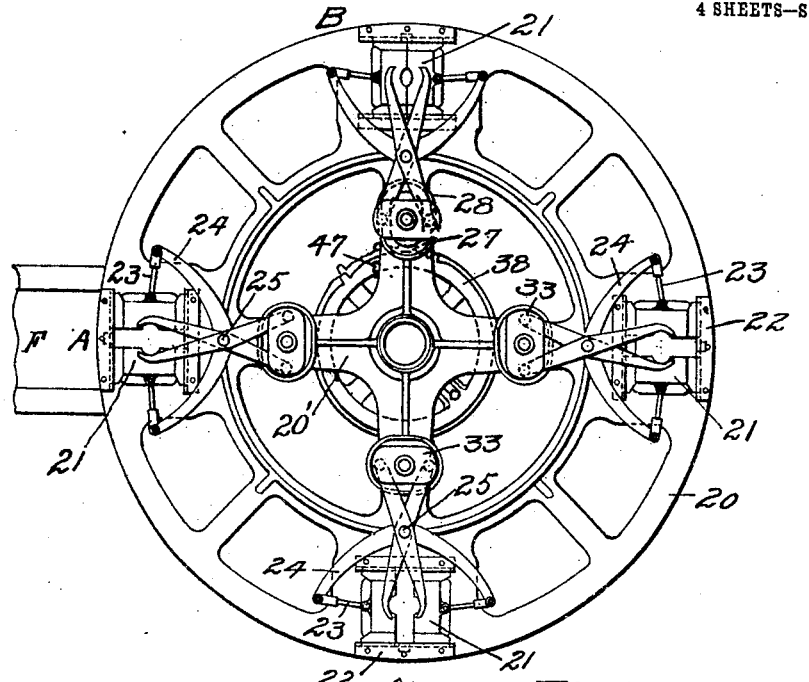
Figures 4, 9:
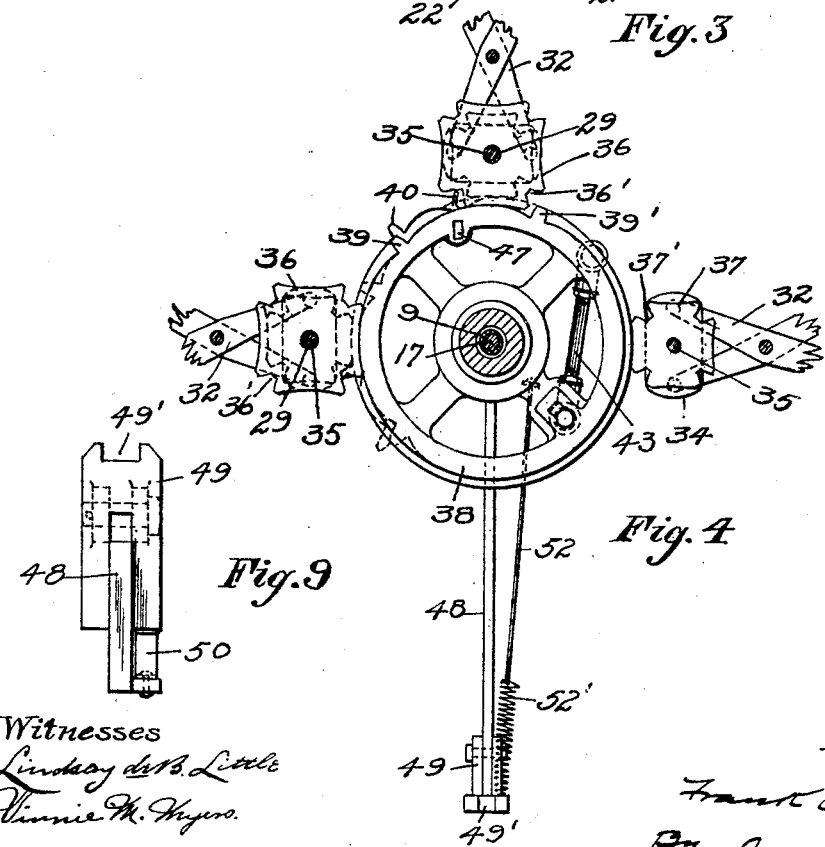
Figure 5:
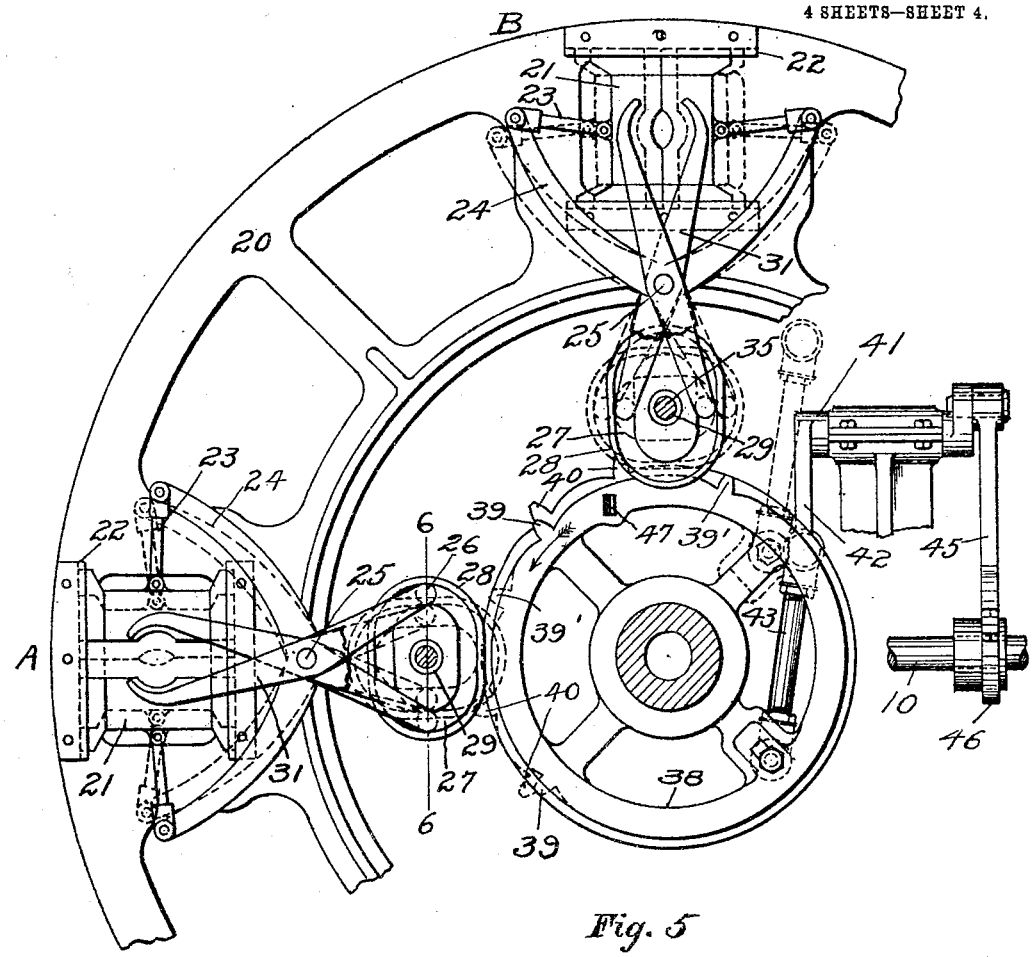
Figure 7:
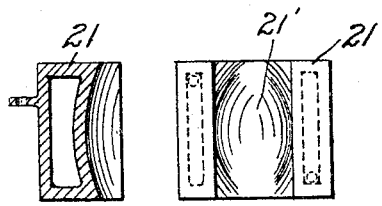
Figure 10:
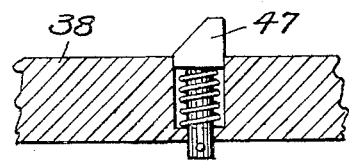

In the accompanying drawings, Figure 1 is a vertical sectional view of a machine embodying my invention. Fig. 2 is a side elevation. Fig. 3 is a top plan view of the carrier and transfer mechanism. Fig. 4 is a similar view of the gearing located below the carrier for operating the transfer receptacles and shears. Fig. 5 is a view of a portion of the carrier, illustrating the operation of the transfer mechanism. Fig. 6 is a vertical sectional view taken on line 6 6 of Fig. 5. Fig. 7 is a detail view of a section of one of the transfer-receptacles, and Fig. 8 is a top plan view of the forming-ring through which the molten glass is drawn. Fig. 9 is an end view of the carrier-locking mechanism. Fig. 10 is a similar view of the carrier-actuating spring-latch.

Referring to the drawings, 2 designates the machine-base, and rising therefrom is stand 3, from which projects vertically the hollow post 4, and adjustably secured to the upper portion of this post at 5' is bracket 5, which projects laterally, so that when in operative position it may overhang the delivery-chamber F of the glass-melting furnace. The outer portion of this bracket is formed with vertically-alining eyes 6 and 6', and rotatable in the former is the tubular bevel-gear 7. Movable through this gear and eye 6' is rod 8, which is splined to gear 7, so as to be rotated thereby. Gear 7 is driven by shaft 7', which in turn is geared to the upper end of the vertical tubular shaft 9 within post 4, while the lower end of shaft 9 is driven by main shaft 10 through the medium of gearing 11.

Detachably secured to the lower end of rod 8 is gathering-iron 12, which rotates and moves vertically in the operation of gathering and drawing the gather from the furnace. For raising and lowering rod 8 the upper portion thereof is revolubly secured in stirrup 13, uniting with lever 14. This lever is fulcrumed between its ends at 14' to the upper portion of bracket 5, and at its end beyond rod 8 carries the adjustable weight 15, and at its opposite end is connected by stirrup 16 with rod 17, movable vertically through tubular shaft 9. At the lower extremity of this rod is roller 18, which rides on the outer edge of cam 19, secured to drive-shaft 10. The arrangement is such that lever 14 exerts a constant upward pull on rod 17, so that the roller is always in engagement with the edge of the cam.

Rotatable on post 4 is a horizontal carriage or carrier 20, which extends beyond the plane of the gathering-iron and which overhangs furnace-chamber F when in operation. Mounted on the outer portion of this carrier are the mold-like transfer-receptacles 21, which are positioned successively over furnace F, with the gathering-iron operative therethrough, as will be presently explained. Each receptacle is divided into vertical halves, which have sliding movements toward and from each other in guideways 22 on carrier 20, the latter being open vertically and with the receptacles extending therethrough, as shown. For opening and closing the receptacles the sections thereof are connected by links 23 to the outer ends of tong-like levers 24, which are fulcrumed between their ends at 25 to the carrier. Pins 26 on the inner ends of these levers project into cam-groove 27 in plate 28, and this plate is secured to the upper end of tubular shaft 29, extending through carrier 20.

Operative across the upper and lower ends, respectively, of receptacle 21 are the shears 31 and 32, the former being mounted on fulcrum-pin 25 and shears 32 at the under side of the carrier on screw 25'. Pins 31' on the inner ends of shears 31 play in cam-grooves 33' of cam-plate 33, while similar pins 32' on shears 32 play in cam-grooves 34' in cam-plate 34. Plates 33 and 34 are secured to shaft 35, which extends through and is rotatable in tubular shaft 29.

Shafts 29 and 35 are separately actuated for operating the transfer-receptacle and the shears, and for this purpose a cross-shaped gear 36 is secured to shaft 29, while a similar gear 37, preferably formed integral with plate 34, is secured to shaft 35. Rotatable on post 4 beneath the carrier 20 is wheel 38, and projecting therefrom are teeth 39 and 39', which are adapted to mesh in corner depressions 36' of gears 36, while teeth 40 on the periphery of said wheel, beneath and projecting beyond teeth 39 and 39', mesh with corner depressions 37' of gears 37.

In the present embodiment of the invention carrier 20 is equipped with four transfer-receptacles, which are equally spaced thereon, and as in such arrangement the carrier makes a quarter-turn at each operation of the machine wheel 38 oscillates a distance equal to one-fourth of its circumference, this movement being effected through the medium of rock-shaft 41, journaled in stand 3 and connected at one end by arm 42 and link 43 to wheel 38, while the opposite end of said shaft is connected by arm 44 and strap 45 to eccentric 46, secured on shaft 10.

Projecting upward normally from wheel 38 is the beveled spring-latch 47, which in the forward oscillation of wheel 38 is adapted to positively engage one of the radial arms 20' of carrier 20 and advances the latter a quarter-turn, while in the backward reciprocation of wheel 38 the beveled latch is automatically depressed when moving beneath the carrier-arm, thus passing to position for a fresh hold.

Projecting outward from stand 3 is arm 48, and pivoted to swing vertically on the outer portion of this arm is latch 49, which is held normally raised by spring 50, with notch 49' in the beveled top face thereof embracing one of lugs 51, depending from carrier 20. The carrier is thus positively held with one of the transfer-receptacles centered above the drawing or charging position and another in proper position for discharging the glass which it has carried forward from the charging-point. Rod 52, having a spring-section 52', connects the lower portion of latch 49 with wheel 38, so that the backward reciprocation of the latter, above referred to, draws forward rod 52 and depresses latch 49 from engagement with the carrier, so that the latter is free to advance with the next forward reciprocation of wheel 38. This operation brings another lug 51 into automatic engagement with bevel-latch 49, the pull of rod 52 having been relaxed during the forward oscillation of wheel 38, so as to permit latch 49 to resume its normally raised position.

The gathering or charging station of the apparatus is indicated at A, which is immediately above furnace F, while the discharging position or station B is immediately above the mold or other device in which the gather is deposited. With the several parts of the machine in the positions shown in the drawings, the gathering-iron 12, which is constantly rotated by the mechanism above described, has completed its upward stroke after having dipped down through the open receptacle 21 and into the molten glass where a gather has been automatically formed, the latter hanging from the gathering-iron to the surface of the glass in a column-like mass, as will be understood by those skilled in the art. At this juncture wheel 38 begins its backward oscillation, as indicated by the arrows and dotted lines in Figs. 4 and 5. At the beginning of this oscillation tooth 39' engages gear 36 and moves it a quarter-turn, which is sufficient to so operate levers 24 as to open receptacle 21 at station B, as shown in dotted lines in Fig. 5, thus discharging the gather therefrom into the mold beneath. The movement of wheel 38 continuing, tooth 39 engages gear 36 of the mechanism at charging position A and imparts a quarter-turn thereto, which is sufficient to move together the separated halves of receptacle 21, the latter closing around and embracing the gather depending from gathering-iron 12. Simultaneous with this operation of closing receptacle 21, though preferably starting a little thereafter, teeth 40 successively engage notches 37' of gear 37, and by the time said teeth have moved to the position indicated in dotted lines in Fig. 5 gear 37 has been given a half-turn, which operates to close and again open the shears, thus severing the glass both above and below receptacles 21, the portion of the gather beneath the receptacle dropping back into the furnace and the upper part thereof adhering to the gathering-iron until the latter is lowered by the next operation. The carrier is then free to advance to the discharging position with the gather contained in the closed receptacle, and by this time wheel 38 has reached the backward limit of its movement and latch 47 is in position for a new hold on the carrier. Wheel 38 then starts its forward oscillation and by means of the latch connection advances carrier 20 therewith, moving the charged receptacle from position A to position B. The next backward oscillation of wheel 38 operates to open the transfer-receptacle at position B and discharge the gather, as above described, and the operation of the machine is repeated. Each of the transfer mechanisms advances in turn from position B and remains inactive until again brought to charging position A. Teeth 40 are so arranged as not to engage gear 37 at position B, so that the shears are operated only when at position A, and, as at that position they are closed and again opened, they are normally open, being undisturbed at any other position.

As the glass is gathered in the manner above explained it is drawn upward through a preliminary forming-ring 53, centered at position A, immediately over furnace F and beneath transfer-receptacle 21, and operating as a gage for the column of molten glass drawn therethrough by the gathering-iron prevents the formation of a gather which is too large for the transfer-receptacle. Ring 53 is removably secured in the open support 54 at the outer end of arm 55, projecting from stand 3, and is preferably hollow to afford circulation for a cooling agent which may be admitted and discharged through pipes 53'.

As the gathering-iron rotates constantly while the machine is in operation, the gather is similarly rotated, the rotation continuing while the sections of the transfer-receptacle are closing together around the glass and until the latter is cut off by the shears. Cavities 21' of the sections of the transfer-receptacle are preferably of such shape that when closed together they form a cavity which is largest at its center and which contracts toward either end. This formation operates to contract or reduce the gather when the receptacle-sections close therearound; but the oval form of the cavities where they open through the upper and lower ends of the receptacle prevent the circular and rapidly-rotating gather from being tightly grasped and severed, as would be the case if the reduced openings through the receptacle ends were of circular form. As the gather is shaped in a preliminary way by the cavity of the transfer-receptacle, and as the quantity of glass for each gather is thus accurately determined, it will be understood that transfer-receptacles of various shapes and sizes may be substituted for those here shown dependent on the work in hand. Similarly the removable gathering-iron 12 may be readily detached from rod 8 and an iron of different size substituted, and ring 53 may be displaced by one of different size.

The sections of the transfer-receptacles are preferably made hollow and connected by sections of hose 56 with pipes 57, which extend from a chamber surrounding post 4. This chamber is divided horizontally, with its lower half 58 rotatable with carrier 20 and its upper half 59 non-rotatable on post 4 and held in place on part 58 by spring 60. A supply of cold air may pass to this chamber through pipe 61 and therefrom through the several pipes 57 to the hollow receptacles 21 and maintain the latter at a proper working temperature. I do not confine myself to the described cooling means, as the desired result may be accomplished in various ways.

The improved machine may be operated in connection with various forms of pressing and blowing machines, its use not being restricted in this regard, and while the machine is here shown equipped with four separate and distinct transfer mechanisms the number may be varied, and it will be understood that the mechanism may be changed or modified in many ways without departing from the spirit of the invention as defined by the appended claims.

I claim—

1. The combination of glass-gathering means and gather-transferring mechanism movable in planes which intersect, whereby the transferring mechanism is adapted to engage and remove the gather.

2. The combination of vertically-movable glass-gathering means, and horizontally-movable gather-transfer mechanism adapted to intersect the plane of movement of the gathering means and remove the gather.

3. The combination of a vertically-movable and revoluble glass-gathering tool, and a gather-transfer device adapted to remove the gather from the gathering-tool.

4. The combination of means for drawing a gather of glass, and a gather-transfer receptacle adapted to receive and remove the gather from the drawing means.

5. The combination of means for drawing a column of molten glass, and glass-embracing transfer mechanism adapted to receive and remove a portion of the drawn column.

6. The combination of means for drawing a column of molten glass, and a molten-glass transfer-receptacle adapted to receive and remove a portion of the drawn column.

7. The combination of means for drawing a column of molten glass, a molten-glass transfer-receptacle adapted to receive a portion of the column, and means for severing from the column the glass received by the receptacle.

8. The combination of means for drawing a column of molten glass, a glass-embracing transfer device adapted to embrace a portion of the column, and means for severing the column above and below the transfer device.

9. The combination of glass-gathering means, and an intermittently-movable transfer device adapted to intersect the plane of movement of the gathering means, the transfer device being constructed and arranged to pause in its movement when adjacent the gathering means and during the operation of the latter and to engage and remove the gather at the completion of the gathering operation.

10. The combination of means for drawing a column of molten glass, a vertically-divided transfer-receptacle adapted to embrace a portion of the column, and means for severing from the column the glass thus embraced.

11. The combination of a gathering-iron, means for rotating the iron and for moving it toward and from a bath of molten glass, and a transfer device adapted to engage the gather after the iron has moved from the bath.

12. The combination of a gathering-iron, means for rotating the iron and for moving it toward and from a bath of molten glass, transfer mechanism adapted to engage a portion of the gather, and means for severing from the gather the portion thereof thus engaged.

13. The combination of a divided transfer device, a gathering-iron movable between the members of said device toward and away from a bath of molten glass, means for closing together the members of the transfer device after the iron has moved from the bath thereby engaging the gather, and means for moving the transfer device out of the line of movement of the gathering-iron.

14. The combination of glass-drawing means, and a transfer device adapted to embrace a portion of the gather, the transfer device being in separable parts formed on their adjacent sides with depressions which register when the parts are closed together, the depressions opening through the upper and lower ends of said parts.

15. The combination of glass-drawing means, and a transfer device adapted to embrace a portion of the gather, the transfer device being formed in separable halves having oval depressions which register when the halves are closed together and which open through the upper and lower ends of the same.

16. The combination of glass-drawing means, a transfer device adapted to embrace a portion of the gather, the transfer device being in separable parts formed on their adjacent sides with depressions which register when the parts are closed together and which open through the upper and lower ends of the same, and glass-severing means above and below the transfer device.

17. The combination of glass-gathering means, and a plurality of molten-glass-transfer devices adapted successively to engage and remove the gather.

18. The combination of glass-drawing means, and a succesion of intermittently-movable transfer devices adapted to intersect the plane of movement of the glass-drawing means, each of said devices being constructed and arranged to pause in its movement when adjacent the gathering means and during the operation of the latter and to automatically engage and remove the gather at the completion of the gathering operation.

19. The combination of glass-gathering means, a molten-glass-transfer device adapted to receive and remove the gather from the gathering means, and means for causing the transfer device to discharge the gather.

20. The combination of upwardly and downwardly movable glass-gathering means, laterally-movable transfer mechanism constructed and arranged to automatically engage and remove the gather from the gathering means, and means for causing the transfer device to automatically discharge the gather.

21. The combination of glass-drawing means, and a succession of transfer devices adapted successively to intersect the plane of movement of the glass-drawing means and automatically engage the gather and remove the same from the drawing means.

22. The combination of glass-gathering means, a gather-transfer device consisting of parts movable toward and from each other, means for automatically closing the parts of said device around a gather, means for moving bodily the transfer device, and mechanism operating to automatically open the transfer device for discharging the gather.

23. In a machine of the character described, a transfer device consisting of parts movable toward and from each other and recessed on their adjacent sides to form a glass-holding cavity when closed around a gather of molten glass, said recesses opening through the opposite ends of said parts, and means for severing the portions of the gather extending through said open ends.

24. The combination of vertically-movable and revoluble glass-gathering means, and a transfer device consisting of parts recessed on their adjacent faces and constructed and arranged to close around the rotating gather, the recesses of said parts tapering toward and opening through opposite ends of said parts and combining to form openings of oval shape.

25. The combination of vertically-movable glass-gathering means, a horizontally-movable carrier, and a plurality of gather-transfer devices mounted thereon and adapted successively to remove the gather from the gathering means.

26. The combination of glass-gathering means, a horizontally-rotatable carrier, and a circular series of gather-transfer devices mounted on the carrier and adapted successively to remove the gather from the gathering means.

27. The combination of a carrier, a series of vertically-divided transfer devices mounted thereon, glass-gathering means adapted to position a gather between the members of each of said devices while the same are separated, and mechanism for closing each of the transfer devices after the gather has been positioned therein.

28. In a machine of the character described, a horizontally-rotatable carrier, a series of recessed and vertically-divided transfer devices mounted thereon, mechanism for closing the successive devices around gathers of molten glass and for subsequently opening the same to release the gathers, and mechanism operating to sever the gather above and below said devices when they close therearound.

29. In a machine of the character described, intermittently-movable glass-gathering means, and a transfer device movable intermittently and alternately with the gathering means and constructed and arranged to engage and transfer the gather.

30. In a machine of the character described, a carrier, a series of transfer devices mounted on the carrier and adapted successively in one position of the carrier to engage a gather and in another position to disengage the same, and reciprocating actuating means adapted in one movement thereof to operate some of said devices for disengaging and engaging their respective gathers without moving the carrier, and when moving in the opposite direction constructed and arranged to advance the carrier without operating the transfer devices.

31. In a machine of the character described, a rotatable carrier, a series of transfer devices thereon adapted to close and open for embracing and releasing gathers of molten glass, gears operatively connected to said devices, an oscillating actuating-wheel adapted to operate said gears for opening and closing said devices, and means for operating the carrier.

32. In a machine of the character described, a rotatable carrier, a series of transfer devices thereon adapted to open and close for embracing and releasing gathers of molten glass, shears above and below the transfer devices for severing the gathers at said points, separate gears for operating the shears and for opening and closing the transfer devices, and actuating means for both of said gears.

33. In a machine of the character described, a rotatable carrier, a circular series of vertically-divided transfer-receptacles thereon, a pair of levers for each receptacle fulcrumed between their ends and at their outer ends secured to the receptacle-sections, a rotatable cam operatively connected to the inner ends of each pair of levers, a gear rotatable with each cam, oscillating wheel 38 concentric with the carrier, and teeth on said wheel adapted to engage said gears for opening and closing the transfer devices.

34. In a machine of the character described, rotatable carrier 20, a circular series of vertically-divided transfer-receptacles 21 thereon, levers 24 fulcrumed between their ends and at their outer ends connected to the receptacle-sections, shears 31 and 32 operative above and below the receptacle, cam 28 operatively connected to the inner ends of the shears, gear 36 for turning the cam, cams 33 and 34 operatively connected, respectively, to shears 31 and 32, gear 37 for rotating cams 33 and 34, the latter being rotatable together and independently of cam 28, oscillating wheel 38, teeth 39 and 39' on said wheel for operating gear 36, and teeth 40 thereon for operating gear 37.

35. The combination of an upright gathering-iron, means for rotating the iron, a lever for moving the iron in the plane of its axis while rotating, and mechanism for intermittently actuating the lever.

36. The combination of an upright gathering-iron, means for rotating the iron, a lever for moving the iron in the plane of its axis while rotating, a rod connected to the lever, and a cam for reciprocating the rod.

37. The combination of a vertical gathering-iron, means for rotating the iron, and continuously-moving actuating mechanism for the iron constructed and arranged to lower and raise the iron while rotating with a pause between the raising and lowering movements thereof.

38. The combination of a vertical gathering-iron, means for rotating the iron, a lever connected to the iron for raising and lowering it while rotating, an actuating-rod connected to the lever, and a cam operatively connected to the rod and having a concentric portion for causing the iron to move intermittently.

39. In a machine of the character described, an upright gathering-iron, a gear through which the iron is splined, an upright tubular shaft operatively connected to said gear, means for driving the tubular shaft, a rod movable longitudinally in the tubular shaft, a lever operatively connecting said rod and the gathering-iron, and means for intermittently reciprocating the rod.

40. In a machine of the character described, an upright tubular post, a laterally-projecting bracket on the post, a vertically-movable gathering-iron supported by the bracket, and mechanism extending through the hollow post and operatively connected to the iron for rotating and vertically reciprocating the same.

In testimony whereof I affix my signature in presence of two witnesses.

FRANK O'NEILL.

Witnesses:
ALBERT C. LANGOW,
EDWARD F. STEIN.